United States Patent [19]

Schultz et al.

[11] 4,203,744

[45] May 20, 1980

[54] METHOD OF MAKING NITROGEN-DOPED GRADED INDEX OPTICAL WAVEGUIDES

[75] Inventors: Peter C. Schultz, Painted Post; Raja R. Wusirika, Corning, both of N.Y.

[73] Assignee: Corning Glass Works, Corning, N.Y.

[21] Appl. No.: 77

[22] Filed: Jan. 2, 1979

[51] Int. Cl.$^2$ .................. C03B 37/00; C03C 3/08; C03C 3/30; C03C 13/00
[52] U.S. Cl. .................. 65/3 A; 65/30 R; 65/112
[58] Field of Search .................. 65/3 A, 30 R, 112

[56] References Cited

U.S. PATENT DOCUMENTS

| | | | |
|---|---|---|---|
| 3,113,008 | 12/1963 | Elmer | 65/31 |
| 3,149,946 | 9/1964 | Elmer | 65/32 |
| 3,823,995 | 7/1974 | Carpenter | 65/3 A X |
| 3,826,560 | 7/1974 | Schultz | 65/3 A X |
| 3,938,974 | 2/1976 | Macedo et al. | 65/3 R |
| 3,999,835 | 12/1976 | Newns et al. | 350/96.31 |
| 4,062,665 | 12/1977 | Izawa et al. | 65/3 A |

FOREIGN PATENT DOCUMENTS 1456537 11/1976 United Kingdom .................. 65/3 A

OTHER PUBLICATIONS

Rand et al., "Silicon Oxynitride Films on Fused Silica for Optical Waveguides", Applied Optics, vol. 11, No. 11, Nov. 1972, pp. 2482–2488.

*Primary Examiner*—Richard V. Fisher
*Attorney, Agent, or Firm*—William J. Simmons, Jr.; Walter S. Zebrowski

[57] ABSTRACT

A method of forming graded index, nitrogen-doped optical waveguides. A cylindrically-shaped porous preform comprising at least two oxides is initially formed. One of the oxides, which more readily reacts with nitrogen, has a greater concentration near the center of the preform than at the outer portion thereof. The preform is treated with a nitrogen-containing compound to form a porous body having a greater concentration of nitrogen in the central portion thereof. The porous preform is consolidated and drawn into an optical waveguide filament.

8 Claims, 5 Drawing Figures

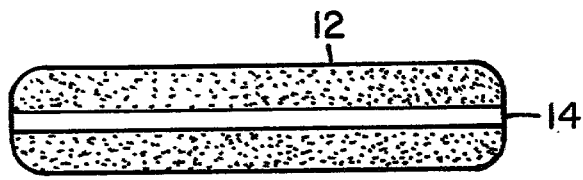
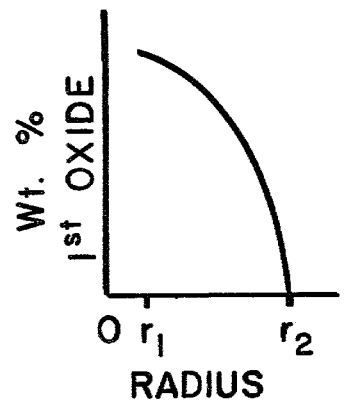
Fig. 2
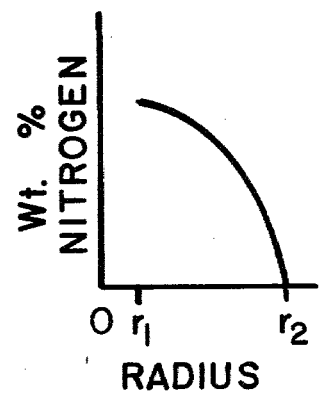
Fig. 3
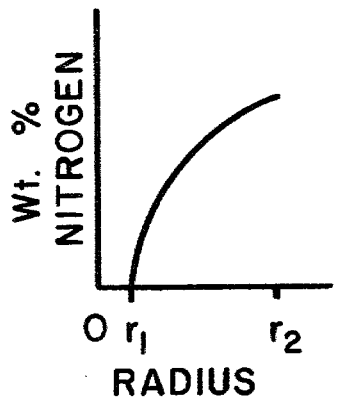
Fig. 4
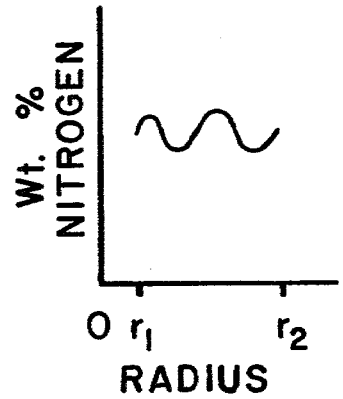
Fig. 5

METHOD OF MAKING NITROGEN-DOPED GRADED INDEX OPTICAL WAVEGUIDES

BACKGROUND OF THE INVENTION

1. Field of the Invention

The present invention relates to a method of making graded index nitrogen-doped glass blanks from which optical devices such as waveguide filaments can be drawn.

Optical waveguides, which are the most promising medium for use in optical communication systems operating in the visible or near visible spectra, normally consist of an optical filament having a transparent core surrounded by a transparent cladding material having a refractive index lower than that of the core. The bandwidth of such filaments can be increased by forming the core thereof in such a manner that the refractive index is greatest along the longitudinal axis thereof and gradually decreases to a lower value at the edge thereof. Such gradient refractive index cores are often formed of a first material of relatively low refractive index such as silica to which there is added a dopant material to increase the refractive index, the concentration of dopant material being greatest at the fiber axis and gradually decreasing with increasing radius to provide the desired refractive index gradient.

2. The Prior Art

U.S. Pat. No. 3,999,835 issued Dec. 28, 1976 to G. R. Newns et al. describes an optical waveguide filament having a core region comprising silica doped with $Si_3N_4$. That patent teaches that the silicon nitride doped silica glass can be formed in a boule by passing a mixture of gaseous compounds containing silicon and nitrogen through an induction coupled plasma discharge. To obtain an index gradient in such a nitrogen doped vitreous silica boule, the exterior thereof is oxidized by heating to a temperature of 800° C. or above for an extended period of time. Newns et al. state that this heat treatment may be carried out before the boule is drawn, during the drawing operation, or the drawn filament may be heat treated. Diffusion controlled oxidation of nitrogen-containing glass does not provide adequate control of the index gradient to the extent necessary for manufacturing high bandwidth optical waveguides. The Newns et al. patent also teaches that silica-silicon nitride glasses can be deposited within a silica tube, the refractive index of the core being varied by varying the percentage of silicon nitride in the glass. This method has been found to be disadvantageous in that it results in the deposition of little, if any, nitrogen in the resultant preform.

Heretofore, nitrogen has been uniformly incorporated into a glass body by treating a glass body in the porous condition by subjecting it to a temperature between 900°–1050° C. in an atmosphere consisting essentially of ammonia gas, and its disassociation products, nitrogen and hydrogen, and thereafter heating and consolidating the porous glass body. Two methods of incorporating nitrogen into a porous glass body are taught in U.S. Pat. Nos. 3,113,008 and 3,149,946 issued to T. H. Elmer. The methods described in the Elmer patents result in a substantially uniform concentration of nitrogen throughout the resultant glass body. Such a uniformly doped preform is not useful, without further modification of nitrogen concentration, in the formation of high bandwidth graded index optical waveguide filaments.

SUMMARY OF THE INVENTION

It is therefore an object of the present invention to provide a method of making a porous preform which has a nitrogen concentration gradient.

The method of the present invention comprises providing a cylindrically shaped glass preform containing throughout its mass a multiplicity of interconnected pores, the preform comprising at least two oxides having different affinities for nitrogen. The concentration of the oxide having the greatest affinity for nitrogen varies radially throughout the preform. The preform is heated in a nitrogen containing atmosphere to a temperature sufficient to cause nitrogen to react therewith. The nitrogen-containing preform is then heated to a temperature sufficient to cause it to consolidate and form a dense glass article.

To form an optical waveguide filament from the preform, the preform is so constituted that the oxide having the greatest affinity for nitrogen has a greater concentration at the central portion of the preform and decreases with decreasing radius. Therefore, the nitrogen treatment results in a porous preform wherein the nitrogen content is greatest in the central portion thereof. The nitrogen-containing preform is consolidated and drawn into a filament. Prior to drawing, the consolidated preform may be provided with a layer of glass which forms the filament cladding.

BRIEF DESCRIPTION OF THE DRAWING

FIG. 1 is a cross-sectional view of a porous glass preform.

FIG. 2 is a graph illustrating the concentration of a first oxide in the preform of FIG. 1.

FIG. 3 is a graph illustrating the concentration of nitrogen in a preform having the oxide concentration illustrated in FIG. 2.

FIGS. 4 and 5 illustrate two of the numerous other nitrogen concentration gradients which can be achieved by the present method.

DETAILED DESCRIPTION OF THE INVENTION

It is to be noted that the drawings are illustrative and symbolic of the present invention and there is no intention to indicate the scale or relative proportions of the elements shown therein.

In accordance with a first embodiment of the present invention there is provided a cylindrically-shaped porous glass preform 12 comprising at least two oxides, a first of which reacts more readily with nitrogen. As shown in FIG. 2 the concentration of the first oxide is greatest at the central portion thereof, the concentration decreasing with increasing radius. Since preform 12 is depicted as having an aperture 14 therethrough, radius $r_1$ is the aperture radius, the outer surface of the preform having a radius $r_2$. It is noted that doped porous preforms having no aperture therein can be formed by the axial deposition technique taught in U.S. Pat. No. 4,062,665 issued to T. Izawa et al.

Preform 12 is disposed in a nitrogen-containing atmosphere at an elevated temperature. By nitrogen-containing atmosphere is meant one containing active nitrogen and/or a nitrogen containing compound which either releases active nitrogen at the treatment temperature or reacts with the soot preform at such temperature to cause nitrogen to be incorporated into the preform. Nitrogen-containing compounds, which can be delivered to the porous preform in vapor form, include ammonia, urea and melamine. Active nitrogen can also be provided by the method described in the publication entitled "Preparation of Nitrides by Active Nitrogen" by M. Shiloh et al., Journal of the Electrochemical Society: Solid-State Science and Technology, Vol. 124, No. 2, Feb. 1977, pages 295-300. That publication describes a process whereby active nitrogen is formed by breaking down an $N_2$ stream in an electric field produced by a DC or RF power source.

The temperature during treatment in the nitrogen containing atmosphere must be sufficiently high to cause incorporation of nitrogen into the preform, but it must obviously be below the consolidation temperature of the preform. The specific temperature depends upon the preform composition and the specific nitrogen containing atmosphere employed. It is believed that the temperature should be greater than 500° C. The preform remains in the nitrogen-containing atmosphere for a time sufficient to cause it to become doped with the desired amount of nitrogen.

After preform 12 is subjected to the nitrogen-containing atmosphere, a greater nitrogen concentration exists in the central portion thereof where the more reactive oxide has the greatest concentration as shown in FIG. 3. It will be obvious to those skilled in the art that the nitrogen concentration can be varied in any desired manner across the preform radius. For example, nitrogen concentrations such as those illustrated in FIGS. 4 and 5 can be obtained by appropriately controlling the concentration of the first oxide within the preform. In this manner optical devices such as filaments and lenses having the desired optical characteristics can be formed.

A well known method of nitriding porous glass is taught in the aforementioned Elmer patents. In accordance with that technique, porous glass is heated to a temperature of 900° C.–1050° C. in an atmosphere of ammonia gas and its dissociation products. Based on free energy data, $B_2O_3$ and $GeO_2$ are more reactive with $NH_3$ than $SiO_2$, whereas $Al_2O_3$ is less reactive than $SiO_2$. Thus, porous $SiO_2$ preforms, which are appropriately doped with $B_2O_3$, $GeO_2$, $Al_2O_3$ or the like, can be employed in the method of the present invention to form glass bodies having a gradient nitrogen concentration. Oxides such as $B_2O_3$ and $GeO_2$ must have a concentration gradient of the type shown in FIG. 2 to obtain the nitrogen concentration gradient of FIG. 3, when these oxides are employed along with $SiO_2$. However, if the porous preform comprises $Al_2O_3$ and $SiO_2$, the concentration of $SiO_2$ must vary in accordance with FIG. 2. The porous preform may include other constituents besides those which affect its reaction with nitrogen. Moreover, it could contain three or more oxides which influence its capability of reacting with nitrogen.

Prior to subjecting a porous preform to a nitriding treatment, it may be subjected to a flushing gas at an elevated temperature to remove contaminants such as water. The flushing gas must be oxygen-free and may consist of a gas such as helium, argon, chlorine, chlorine-containing vapors and the like.

After the preform is subjected to the nitriding heat treatment, the nitrogen concentration thereof is as illustrated in FIG. 3 provided that the oxide concentration within the preform is as illustrated in FIG. 2. It is then subjected to a further heat treatment at a higher temperature to consolidate the porous glass into a solid glass body. The specific consolidation heat treatment depends upon the type of porous preform employed as well as the composition thereof. Since some of the nitrogen within the preform may volatilize during the process of consolidation, it may be advantageous to consolidate in a high pressure, oxygen-free atmosphere of inert gas such as nitrogen or argon.

After consolidation of the porous glass preform, a gradient nitrogen concentration exists within the resultant solid glass article. Depending upon the preform composition and the consolidation heat treatment, the preform aperture, if indeed any initially existed, may close during the consolidation process. If the aperture still exists after consolidation, it can be closed by further heat treatment.

The cylindrically-shaped glass blank is then formed into the desired optical device. It can be cut transversely into disks which are ground and polished to form lenses. The glass blank could also be heated to the drawing temperature of the materials thereof, generally about 2000° C., and drawn to decrease the diameter thereof, thereby forming an optical waveguide filament. Drawing is continued until the final waveguide dimensions are obtained. If the consolidation process fails to close aperture 14, the aperture will close during the drawing operation. An additional cladding layer can be formed on the filament by inserting the consolidated glass blank into a tube of glass having a lower refractive index or by depositing on the surface of the consolidated glass blank an additional layer of glass by a process such as flame hydrolysis, chemical vapor deposition or the like.

It can be seen that by properly controlling the concentration gradient of the metal oxide dopant in the porous glass preform, the desired nitrogen gradient and thus the desired refractive index gradient can be built into the resultant optical device.

Various types of porous preforms may be employed in the present method, and various methods may be employed to incorporate an oxide dopant into a porous glass preform so that at least one oxide has a concentration gradient as shown in FIG. 2. Some of these methods will be described hereinbelow.

Porous glass preforms are an intermediate product in a number of processes which produce glass articles. In some of these processes the preform has a gradient oxide concentration, the concentration of at least one oxide at the central portion of the preform being greater than that at the outer portion thereof. U.S. Pat. Nos. 3,823,995 issued to L. L. Carpenter, 3,826,560 issued to P. C. Schultz, and 3,938,974 issued to P. B. Macedo et al. describe methods of producing porous glass preforms having such gradient oxide concentrations.

In accordance with the teachings of the Carpenter patent a stream of carrier gas, such as oxygen, is introduced into and passes through volatile compounds, such as $SiCl_4$ and $GeCl_4$. The vapors of the volatile compounds are entrained by the carrier gas and the mixture passes through a tube leading to a combustion burner wherein the vapors of the volatile compounds are hydrolyzed to form particles of $GeO_2$-doped $SiO_2$ in the flame of the burner. A mandrel or support member, such as a rod, is rotated and oscillated at a controlled rate so that the particles produced by the burner are deposited uniformly over the mandrel. The flame is maintained at a sufficiently low temperature so that the small spherical doped silica particles which are produced bond tightly together in a preform body to leave a network of continuous open pores throughout the structure of the body. After the first layer of soot is applied to the mandrel the gas-vapor mixture is changed for each successive layer so that each of the plurality of layers have a composition whereby the desired stepped radially varying composition is obtained. The mandrel can be pulled from the soot body, leaving a hollow, cylindrically-shaped porous preform.

The method of the aforementioned Schultz patent differs from that of the Carpenter patent in that the dopant concentration is continuously varied while the burner traverses the mandrel.

Porous glass preforms can be initially formed having a uniform composition throughout and thereafter treated with an oxide dopant to provide a gradient concentration of one or more oxides therein. Homogeneous porous glass preforms can be formed by the aforementioned flame hydrolysis process and by the processes disclosed in U.S. Pat. No. 2,221,709 issued to H. P. Hood et al, No. 3,678,144 issued to R. D. Shoup, No. 3,782,982 issued to J. E. Pierson et al. and No. 3,827,893 issued to H. E. Meissner et al.

The method disclosed in the Hood patent includes (1) forming a tubular article from a borosilicate glass; (2) thermally treating the glass tube for a sufficient period of time to cause the glass to separate into a silica-rich and a silica-poor phase; dissolving or leaching the silica-poor phase, usually with acid, to produce a porous structure composed of the silica-rich phase; (3) washing to remove leaching residue; and (4) drying. It is noted that the ordinary methods of drying such high silica content glass articles in air result in the incorporation of a minute amount of water in the structure of the glass. The resultant porous preform can therefore be subjected to further well known treatment to reduce the water content thereof.

The Shoup, Pierson et al. and Meissner et al. patents pertain to methods of forming a porous glass body by adding certain esters or inorganic salts, which hydrolyze to weak acids, to true solutions, colloidal solutions and suspensions of soluble silicates containing more than 1 mole of silica per liter and having a pH greater than about 10. A reaction takes place wherein the silica will polymerize into a network structure.

In accordance with the teachings of the aforementioned Macedo et al. patent a porous glass tube of uniform composition can be treated in such a manner as to create therein a gradient concentration of a given dopant oxide. For example, $Ge(OC_3H_7)_4$ vapor is diffused into a porous silica tube through the inner surface, and simultaneously, water vapor is diffused into the tube through the outer surface. The resultant thermal decomposition yields a precipitate $GeO_2$ whose concentration in the pores is a maximum in the central portion of the tube and decreases radially.

A specific example of forming a gradient index glass article by the method of the present invention is as follows. A porous soot preform is produced in accordance with the teachings of the aforementioned Carpenter patent. Liquid $SiCl_4$ is maintained in a reservoir at a temperature of 35° C. Dry oxygen is bubbled through the liquid so that the vapor thereof is picked up by the oxygen. The oxygen is initially bubbled through the liquid $SiCl_4$ at the rate of 500 cc/min and is combined with gaseous $BCl_3$ flowing at the rate of 105 cc/min, these reactants being combined with 600 cc/min oxygen and fed to a burner. Under these conditions, the vapors entrained within the oxygen are oxidized within the flame of a flame hydrolysis burner which produces a soot, the composition of which is about 94 wt.% $SiO_2$ and 6 wt.% $B_2O_3$. This soot is deposited layer by layer onto a rotating and translating alumina mandrel 6 mm in diameter and 1 meter long. After the first soot layer is applied, the flow of $BCl_3$ is decreased to yield a second soot layer of decreased $B_2O_3$ content. The $BCl_3$ is incrementally decreased for each subsequent pass of the burner until the outer soot layer is pure $SiO_2$. Each incremental decrease in $BCl_3$ flow rate is selected to provide the desired ultimate stepped radially varying $B_2O_3$ concentration. A composite structure 17.5 cm long by 3 cm diameter and having approximately 500 layers may be produced in about 2.5 hours.

The mandrel is pulled from the porous preform which is then transferred to a furnace at 500° C. which is flushed with helium for 16 hours. The furnace temperature is increased to 1000° C. and the preform is treated in ammonia for 8.5 hours. This treatment is accomplished by inserting a quartz tube into the end of the preform aperture and flowing He and $NH_3$ into the tube at the rates of 115 cc/min and 170 cc/min, respectively. A flushing gas of helium flows through the furnace at a rate of 500 cc/min during the ammonia treatment. The furnace is then cooled to room temperature while the helium flushing gas continues to flow.

The resultant nitrogen-doped porous preform is transferred to a hot pressing apparatus where it is heated at 1530° C. for one hour in an argon atmosphere at 2500 psi. In this apparatus the preform is consolidated to form a dense glass body. The central portion of the resultant glass blank contains 4.05 wt.% nitrogen and the surface region thereof, which contains no $B_2O_3$, contains only about 1.0 wt.% nitrogen. The refractive index change in a fused silica based glass due to the presence of nitrogen therein is about 1% per wt.% nitrogen. The $B_2O_3$ present in the preform has very little effect on the refractive index thereof, its presence merely tending to decrease the refractive index a few tenths of a percent in the central portion of the preform. Since the effect of nitrogen on refractive index is so much greater than that of $B_2O_3$, the refractive index at the center of the consolidated glass blank is about 3% higher than that at the outer portion thereof.

To form an optical waveguide filament from the consolidated glass blank, the blank is inserted into a silica tube having a refractive index lower than that of the blank. This composite structure is placed in an induction furnace and drawn at a temperature of about 2000° C. As the structure is drawn, it decreases in diameter and the central aperture collapses. Drawing is continued until the final desired waveguide dimensions are obtained.

We claim:

1. A method of making a glass article comprising the steps of providing a cylindrically shaped glass preform containing throughout its mass a multiplicity of interconnected pores, said preform comprising at least two oxides having different affinities for nitrogen, the concentration of the oxide having the greatest affinity for nitrogen varying radially through said preform, heating said porous preform in a nitrogen-containing atmosphere at a temperature sufficient to cause nitrogen to react therewith, and heating said preform to a temperature sufficient to cause said preform to consolidate and form a dense glass article.

2. A method in accordance with claim 1 wherein said porous preform comprises $SiO_2$ and at least one of the oxides selected from the group consisting of $B_2O_3$, $GeO_2$ and $Al_2O_3$.

3. A method in accordance with claim 1 wherein said nitrogen containing atmosphere comprises ammonia.

4. A method in accordance with claim 1 wherein the concentration of the oxide having the greatest affinity for nitrogen is greatest in the central portion of said preform and decreases with increasing radius.

5. A method in accordance with claim 4 further comprising the step of heating said dense glass article to the drawing temperature of the material thereof and drawing to form a filament.

6. A method in accordance with claim 4 further comprising the steps of forming a layer of cladding glass on the outer surface of said dense glass article and thereafter, heating the resultant composite article to the drawing temperature of the materials thereof and drawing to form a filament.

7. A method in accordance with claim 1 further comprising the step of cutting said dense glass article transversely into disks.

8. In the method of manufacturing a cylindrically shaped dense glass article having a gradient refractive index which comprises the steps of
   forming a porous preform,
   incorporating into said preform a dopant, the concentration of which is greatest in the central portion thereof, and
   consolidating said preform to form a dense glass article,
the step of forming being characterized in that it comprises forming a porous preform comprising at least two oxides having different affinities for nitrogen, the concentration of the oxide having the greatest affinity for nitrogen being greatest in the central region thereof and decreasing with increasing radius, and the step of incorporating comprising heating said porous preform in a nitrogen-containing atmosphere at a temperature sufficient to cause nitrogen to react therewith, thereby forming a nitrogen-doped preform wherein the concentration of nitrogen is greatest in the central portion thereof, the nitrogen concentration decreasing with increasing radius.

* * * * *